United States Patent Office 3,303,001
Patented Feb. 7, 1967

3,303,001
LOW TEMPERATURE SHIFT REACTION INVOLVING A ZINC OXIDE-COPPER CATALYST
Edward K. Dienes, Louisville, Ky., assignor to Catalysts and Chemicals, Inc., a corporation of New Jersey
No Drawing. Filed Dec. 16, 1963, Ser. No. 330,542
3 Claims. (Cl. 23—213)

This invention in one of its aspects pertains to low temperature shift reactions. In another of its aspects the invention relates to catalysts for such low temperature shift reactions. In still another of its aspects this invention relates to methods for preparing low temperature shift reaction catalysts.

The most important uses of hydrogen today are its use in the petrochemical industry, and for the synthesis of ammonia. To produce hydrogen for these purposes a gas reforming process is generally used. In gas reforming, natural gas, or a low molecular weight hydrocarbon such as methane, ethane or propane, is usually reacted with steam. Steam and hydrocarbons when passed over a catalyst containing certain metals such as a metal of the iron group, form hydrogen, carbon monoxide and carbon dioxide. In a second stage of this well known and commercial process for hydrogen preparation the process is operated to bring about a water gas shift reaction by which carbon monoxide and water, or steam, are reacted to form carbon dioxide and hydrogen. The carbon monoxide must be thus converted to carbon dioxide because carbon dioxide can be removed more readily from the system to produce more pure hydrogen.

To produce pure hydrogen from water gas, or other carbon monoxide containing gases and steam, it is the practice to pass the water gas over a shift catalyst, the following reaction occurring:

$$CO + H_2O \rightleftharpoons CO_2 + H_2$$

The temperature at which this reaction is generally carried out is 750° F. to 850° F. Unfortunately, catalyst life at these temperatures is short. In addition the required high temperatures do not favor the above equilibrium. The equilibrium shifts to the right, that is, to the production of hydrogen, as the temperature is decreased. However, heretofore a catalyst has not been found which promotes this reaction at temperatures of 500° F. and lower. In order to overcome this difficulty it has been the practice to increase the amount of steam in order to shift the equilibrium in the desired direction. This invention, however, is based on the discovery that certain copper-zinc catalysts, if carefully prepared following the teachings of this invention, permit the water gas shift reaction to be carried out at temperatures of 500° F. and below.

Catalysts normally employed in a water gas shift reaction are iron-chromium catalysts such as $Fe_2O_3$ in combination with 1 to 15 percent by weight of $Cr_2O_3$. However a reduced copper oxide-zinc oxide catalyst (CuO·ZnO) is disclosed for this purpose in U.S. 1,797,426, along with shift reaction temperatures of 570° F. or higher. These catalysts are prepared by coprecipitating copper and zinc salts using dilute ammonia, or by fusing a mixture of the oxides.

It is generally known in industrial catalysts that catalyst efficiency depends upon such physical characteristics as the surface area and pore volume of a catalyst. It is also known that pore volume and surface area vary widely depending on how a given catalyst is made. It has now been found that if a copper oxide-zinc oxide catalyst is made by a specific technique following the teachings of this invention a copper oxide-zinc oxide catalyst results, which when reduced to zinc oxide and copper permits a high conversion of carbon monoxide in water gas to hydrogen and carbon dioxide at a temperature of 500° F.

and lower, say 350° F. to 500° F. Not only do the catalysts of this invention favor a low temperature shift reaction with its more desirable equilibrium, but they perform much longer due to the low temperature conditions under which they are used.

An object of this invention, therefore, is to produce a long life, low temperature shift catalyst.

Another object of this invention is to provide a process for the production of such a low temperature shift catalyst. Heretofore no catalyst has been known which could be used in a shift converter operated at 500° F. or lower.

Still another object of the invention is to produce a catalyst whose physical characteristics favor the low temperature conversion of carbon monoxide in a water gas shift reaction.

In accordance with this invention a low temperature copper oxide-zinc oxide shift catalyst is made containing zinc oxide and copper as its active ingredients after reduction, in a weight ratio based on metal of 0.5 to 3 zinc to 1 copper. This catalyst is prepared by coprecipitating copper and zinc as their carbonates from an aqueous solution of their soluble salts through double decomposition reaction with sodium carbonate, removing the sodium salts so that the level of sodium, calculated from sodium oxide after calcining to the oxides, is less than 0.2 percent and calcining the sodium carbonate-containing copper and zinc carbonate precipitate to form the oxides.

As indicated hereinbefore catalyst activity is very dependent upon the steps used in the preparation of the catalyst. In preparing the catalyst of this invention water soluble mixtures of copper and zinc salts, for instance their chlorates, chlorides, sulfates, nitrates and acetates, are coprecipitated in amounts resulting in the desired copper-zinc ratios. It is preferred to employ the nitrates, and coprecipitation is brought about by the addition of sodium carbonate. A dilute aqueous solution of the copper and zinc salts is combined with a dilute aqueous solution of sodium carbonate, forming the coprecipitate by double decomposition. Usually it is the practice to add the sodium carbonate solution to the copper-zinc salt solution. In other words the basic substance is added to the acidic substance. When the base is added to the acid, however, stainless steel or other similar reaction vessels are required. In accordance with one aspect of this invention the acidic material, contray to prior art methods, is added to the basic material. When the sodium carbonate solution is placed in the reactor and the copper-zinc salt solution is added thereto, it is unnecessary to use stainless steel equipment. More important, without intending to be bound by any theory, the surface area and pore volume of a catalyst precipitated in this way appear to differ from those of similar catalysts otherwise precipitated.

One of the discoveries on which this invention is based concerns the sodium level in the catalyst. The quantity of sodium, generally present in the final catalyst as the oxide, markedly affects the performance of the copper-zinc catalyst. In accordance with this invention it has been found that the sodium content of the copper-zinc catalyst should not exceed 0.2 percent based on metal. Preferably the sodium content in the catalyst should be below 0.05 percent based on sodium metal. To remove sodium contaminants the precipitated carbonates are washed, either by repeated decantation or by the use of conventional thickening apparatus until the precipitate is virtually devoid of sodium, in other words until the sodium level is below 0.2 percent.

Referring now more specifically to the shift process, except for the low temperature, with its favorable effect on reaction equilibrium, resulting from the practice of this invention, water gas shift reactions are well known.

Carbon monoxide, or a gas containing 20 percent or more carbon monoxide by volume, and steam are introduced into a shift converter and passed over the reduced copper oxide-zinc oxide shift catalyst. The reduction can best be carried out in situ using the reaction mixture of steam and carbon monoxide. The catalyst can also be reduced with hydrogen gases. However, if certain particular techniques are not followed during such a hydrogen reduction, the reduced catalyst is ineffective as a shift catalyst. After reduction, in the shift converter, carbon monoxide and steam, in an amount of 3 to 10 volumes per volume of carbon monoxide in the feed gas, in contact with the shift catalyst, undergo reaction at the required temperature, which according to this invention is 350° F. to 500° F. The pressure is preferably in the range of 200 to 400 pounds per square inch (p.s.i.g.), although it may vary from atmospheric to 800 p.s.i.g. The space velocity, which is the volume of gas flowing under standard conditions of temperature and pressure per unit volume of catalyst per hour, of the carbon monoxide-containing gas, on a dry basis, is desirably between 300 and 6500 (cubic feet per hour per cubic foot of catalyst).

The preparation of the catalysts of this invention and their effectiveness in the conversion of carbon monoxide can, perhaps, best be illustrated by reference to specific examples. For a further understanding of the invention reference is made to the following.

EXAMPLE 1

Preparation of the catalyst

To 4300 parts by weight of a 16 percent sodium carbonate solution heated to 140° F., are added 2620 parts by weight of an 8 percent (based on metal) solution consisting of zinc and copper nitrates in a mol ratio (also based on metal) of one zinc to one copper, heated to 90° F. The 8 percent metal solution is made by mixing 482 parts by weight of $Zn(NO_3)_2 \cdot 6H_2O$ and 478 parts by weight of $Cu(NO_3)_2 \cdot 6H_2O$ with 1670 parts by weight of water. The zinc carbonate-copper carbonate formed is washed free of sodium nitrate and sodium bicarbonate by decantation, allowing the solid to settle to 20 to 25 percent of vessel volume, decanting, and refilling to original volume. Approximately four to six decantations are needed to remove the sodium to the required level. The metal carbonates are filtered on a Sperry filter press and calcined for four hours at 700° F. to form the oxides. The resulting oxides are de-aerated by forming a mud and then they are control dried to 5 to 10 percent moisture. The cake is granulated through a No. 8 mesh screen, mixed with 1 to 3 weight percent graphite as a lubricant and pelletized into 3/16 inch tablets on a Stokes tabletting machine. The tablets are then heated for four to ten hours at 300° F. to temper tabletting stresses.

EXAMPLE 2

Catalyst preparation

Following the procedure set forth in Example 1, a catalyst is made by combining 578 parts by weight of $Zn(NO_3)_2 \cdot 6H_2O$ with 383 parts by weight $$Cu(NO_3)_2 \cdot 6H_2O$$

with the same amount of water used in Example 1. The resulting catalyst contains zinc and copper in a ratio, based on metal, of 1.5 zinc to 1 copper.

EXAMPLE 3

Catalyst preparation

According to the procedure of Example 1 another catalyst is made using 640 parts by weight $Zn(NO_3)_2 \cdot 6H_2O$ and 309 parts by weight $Cu(NO_3)_2 \cdot 6H_2O$ with the amount of water set forth in Example 1. The resulting catalyst contains zinc and copper in a ratio, based on metal of 2 to 1.

EXAMPLE 4

Catalyst preparation

Using the procedure of Example 1 a catalyst is made with 720 parts by weight $Zn(NO_3)_2 \cdot 6H_2O$, 240 parts by weight $Cu(NO_3)_2 \cdot 6H_2O$ and the same amount of water. The resulting catalyst contains zinc and copper in a weight ratio based on metal of 3 to 1.

In one of its aspects this invention is based on the discovery that the sodium content of the catalyst must be below 0.2 weight percent. This is shown by the following:

TABLE A

Reaction: $CO + H_2O \rightleftarrows CO_2 + H_2$
Conditions—Shift converter:
 Catalyst—Example 3
 Temperature—360° F., 400° F., 500° F.
 Pressure—150 p.s.i.g.
 Space Velocity (dry gas)—4,500
 Steam/Gas Ratio—1/1
 Gas Composition—25% CO:75% $H_2$

| Sodium Content of Catalyst, Percent | Percent Conversion | | |
|---|---|---|---|
| | 500° F. | 400° F. | 360° F. |
| 0.05 | 98.0 | 97.0 | 94.0 |
| 0.10 | 98.0 | 97.0 | 83.0 |
| 0.20 | 96.0 | 84.0 | 70.0 |
| 0.50 | 87.0 | | 36.4 |

As can be seen from Table A, the percent conversion drops rapidly, particularly at lower temperatures, as the sodium content of the catalyst is increased. At 1 percent sodium in the catalyst on a weight basis conversions are even lower still. In addition to the sodium content of the catalyst, the ratio of zinc to copper in the catalyst of this invention is also important. This is shown by the following table.

TABLE B

Reaction: Same as in Table A.
Conditions: Same as in Table A.

| Zinc/Copper Ratio of Catalyst | Percent Conversion | | |
|---|---|---|---|
| | 500° F. | 400° F. | 360° F. |
| 3/1 | 98.0 | 97.0 | 86.0 |
| 2/1 | 98.0 | 96.0 | 94.0 |
| 1.5/1 | 98.0 | 97.0 | 94.0 |
| 1/1 | 98.0 | 96.0 | 87.5 |

It can be seen that at higher temperatures within the range contemplated herein the zinc/copper ratio is not as critical as it is in the narrower 360° F. to 400° F.

EXAMPLE 5

Plant preparation

In a commercial unit a copper-zinc catalyst is produced by pumping 565 cubic feet of a solution containing 918 pounds of copper as copper nitrate and 1890 pounds of zinc as zinc nitrate (specific gravity approx. 1.180) into a 15.7 percent solution of soda ash (light). The volume of the soda ash solution is 450 cubic feet. (Theoretical weight of precipitate—3500 lbs.) The soda ash solution is pumped into a 1695 cu. ft. tank equipped with a mechanical agitator and heated to 140° F. The copper-zinc solution is heated to 110° F. and sprayed over the surface of the soda ash solution. The soda ash solution is maintained at 140° F. to 142° F. during this precipitation reaction by sparging with live steam. The final pH of the mixture is 7.0 to 8.5. After precipitation the batch is washed to remove sodium by decanting off approximately 80 percent of the solution in the precipitation tank. The wash temperature is approximately 90° F. Four washes are used in this decantation as follows: 1st—595 cu. ft.; 2nd—1310 cu. ft.; 3rd—1310 cu. ft.; and 4th—1310 cu. ft. After the fourth decantation, the material is filtered and then loaded on racks and calcined at 700° F. to a weight loss of 1 percent or less. At this point the sodium content is 0.10 to 0.15 percent. The calcined material is suspended in water (3500 lbs. of the oxides in 1695 cu. ft. of water) at 90° F. to 100° F. The resulting mixture is filtered out of the slurry and dried to 1 percent or less weight loss at 325° F. The sodium content at this point is 0.05 percent or less. The dried filter cake to which 2 percent graphite is added as a lubricant is then sized and formed into ¼ inch tablets. Conversion with this catalyst is similar to that shown for the 0.05 percent sodium catalyst in Table A.

In one of its aspects this invention is concerned with the addition of the acidic material to the basic material. The catalysts of the invention, insofar as sodium content is concerned, can, however, be prepared by the addition of the basic material to the acidic material. This reverse method of precipitation is shown in Example 6 which follows.

EXAMPLE 6

The precipitated catalyst is produced by adding 2080 parts by weight of a 15.7 weight percent soda ash solution (sp. gr. 80° F.—1.16) into an 8 weight percent metal solution containing 68.8 copper as copper nitrate and 142 parts by weight zinc as zinc nitrate. The temperature of the mechanically agitated metal solution is maintained at 140° F. during the precipitation, and the soda ash, heated to 110° F. is added to the copper-zinc nitrate solution at such a rate as to give a 45 to 60 minute precipitation. The precipitate is washed free of sodium by decantation, approximately 80 percent of the solution being withdrawn during four washings. After further washing and decanting at 90° F. the material is filtered, mixed with graphite and tableted as set forth in the preceding examples, tablets being ⅜ or ¼ inch pellets.

EXAMPLE 7

Precipitation according to the procedure of Example 6 but at a lower temperature (80° F. to 100° F.) results in a lighter density precipitate with slow settling properties making decantation difficult. This precipitate is washed by filtration. At temperatures below 500 F. outstanding conversions, though slightly less than in Table B, are obtained using both of these catalysts.

The foregoing examples and tables show that this invention permits operation of a shift converter on a commercial scale at a low temperature and thus provides great flexibility in the manufacture of hydrogen. Because of the low temperatures used, the catalysts of this invention are longer lasting and more efficient due to less deterioration and a favorable shift in the reaction equilibrium. Given the teachings of this invention, variations and modifications will occur to those skilled in the art. Thus, other methods of handling the precipitate can be used. In addition the catalysts herein can be used in gas purification in addition to the manufacture of hydrogen. Such ramifications are within the scope of this invention.

What is claimed is:

1. In the process for producing hydrogen by a shift reaction involving reacting carbon monoxide with steam the improvement permitting said shift reaction to be carried out at a low temperature in the range of 350° F. to 500° F. which comprises at said temperature, at a pressure in the range of atmospheric to 800 pounds per square inch gauge, and at a space velocity of 300 to 6500 cubic feet per hour per cubic foot of catalyst passing the reaction gases, including steam, over a reduced copper oxide-zinc oxide shift catalyst containing as its active ingredients after reduction zinc oxide and copper in a weight ratio based on metal of 0.5 to 3 zinc to 1 copper prepared by coprecipitating copper and zinc as their carbonates from an aqueous solution of their soluble salts through double decomposition reaction with sodium carbonate, removing the sodium salts so that the level of sodium, calculated from sodium oxide after calcining to the oxides, is less than 0.2 percent, calcining the sodium carbonate-containing copper and zinc carbonate precipitate to form a mixture of the oxides, and reducing the oxide mixture to zinc oxide and copper.

2. The process of claim 1 wherein the zinc to copper ratio is 2 to 1 and wherein a sodium level of less than 0.15 percent is obtained by repeated washing of the carbonate precipitate.

3. The process of claim 1 wherein the zinc to copper ratio is 2 to 1, wherein the precipitation is accomplished by the adidtion of the copper-zinc salt solution to the sodium carbonate solution, and wherein the sodium level is less than 0.10 percent.

References Cited by the Examiner

UNITED STATES PATENTS

| 1,797,426 | 3/1931 | Larson | 23—213 |
| 1,809,978 | 6/1931 | Larson | 23—213 |
| 2,206,773 | 7/1940 | Hale | 252—475 X |
| 2,275,181 | 3/1942 | Ipatieff et al. | 252—475 X |

FOREIGN PATENTS 636,800  5/1950  Great Britain.

OSCAR R. VERTIZ, *Primary Examiner.*

B. H. LEVENSON, *Assistant Examiner.*